United States Patent
Choi et al.

(10) Patent No.: US 11,894,576 B2
(45) Date of Patent: Feb. 6, 2024

(54) BATTERY MODULE INCLUDING CONNECTOR HAVING BIDIRECTIONAL COUPLING STRUCTURE

(71) Applicant: LG Chem, Ltd., Seoul (KR)

(72) Inventors: Youngho Choi, Daejeon (KR); Hyunchul Choi, Daejeon (KR); Hyejin Kim, Daejeon (KR)

(73) Assignee: LG Energy Solution, Ltd.

(*) Notice: Subject to any disclaimer, the term of this patent is extended or adjusted under 35 U.S.C. 154(b) by 708 days.

(21) Appl. No.: 17/044,997

(22) PCT Filed: Dec. 4, 2019

(86) PCT No.: PCT/KR2019/017024
§ 371 (c)(1),
(2) Date: Oct. 2, 2020

(87) PCT Pub. No.: WO2020/116936
PCT Pub. Date: Jun. 11, 2020

(65) Prior Publication Data
US 2021/0167466 A1    Jun. 3, 2021

(30) Foreign Application Priority Data

Dec. 5, 2018 (KR) .................. 10-2018-0155513
Dec. 3, 2019 (KR) .................. 10-2019-0159240

(51) Int. Cl.
*H01M 50/503* (2021.01)
*H01M 50/249* (2021.01)
(Continued)

(52) U.S. Cl.
CPC ....... *H01M 50/503* (2021.01); *H01M 10/425* (2013.01); *H01M 50/204* (2021.01);
(Continued)

(58) Field of Classification Search
CPC ............ H01M 50/519; H01M 10/482; H01M 50/249; H01M 50/284; H01M 2220/20;
(Continued)

(56) References Cited

U.S. PATENT DOCUMENTS

2006/0030191 A1    2/2006  Tuin et al.
2013/0101883 A1*   4/2013  Zhao .................. H01M 50/543
                                                              429/121

(Continued)

FOREIGN PATENT DOCUMENTS

CN    103367686 A    10/2013
CN    103546095 A    1/2014
(Continued)

OTHER PUBLICATIONS

Machine English translation of CN 206451944 to Wei (Year: 2017).*

(Continued)

*Primary Examiner* — Michael L Dignan
(74) *Attorney, Agent, or Firm* — Lerner David LLP

(57) ABSTRACT

A battery module includes: a cell assembly including at least one battery cell; a module case accommodating the cell assembly; and a module connector mounted outside the module case, electrically connected to the cell assembly, and configured to connect to an external connector outside the module case. A coupling surface of the module connecter may have a first fastening part opened in at least one direction, and a corresponding coupling surface outside the module case may have a second fastening part opened bidirectionally so as to be inserted into the first fastening part in a first direction or in a second direction opposite thereto.

18 Claims, 4 Drawing Sheets

(51) Int. Cl.
  *H01M 50/505* (2021.01)
  *H01M 50/204* (2021.01)
  *H01M 10/42* (2006.01)
  *H01M 50/50* (2021.01)
  *H01M 50/244* (2021.01)
  *H01M 50/262* (2021.01)

(52) U.S. Cl.
  CPC ....... *H01M 50/244* (2021.01); *H01M 50/249* (2021.01); *H01M 50/262* (2021.01); *H01M 50/50* (2021.01); *H01M 50/505* (2021.01); *H01M 2220/20* (2013.01)

(58) Field of Classification Search
  CPC ............. H01M 50/502; H01M 50/507; H01M 50/516; H01M 50/517; H01M 50/528; H01M 50/569; H01M 50/209; Y02E 60/10
  See application file for complete search history.

(56) References Cited

U.S. PATENT DOCUMENTS

| | | |
|---|---|---|
| 2013/0260611 A1 | 10/2013 | Ahn |
| 2014/0014164 A1 | 1/2014 | Song et al. |
| 2015/0303446 A1 | 10/2015 | Jung |
| 2016/0301111 A1 | 10/2016 | Tyler et al. |
| 2018/0065573 A1 | 3/2018 | DeKeuster |
| 2018/0076487 A1 | 3/2018 | Lee et al. |
| 2018/0090735 A1* | 3/2018 | Huff .................... H01M 10/486 |
| 2018/0108898 A1 | 4/2018 | Shoji et al. |
| 2018/0151921 A1 | 5/2018 | Yun |

FOREIGN PATENT DOCUMENTS

| | | | | |
|---|---|---|---|---|
| CN | 205810940 U | | 12/2016 | |
| CN | 206451944 | * | 8/2017 | ............ H01R 13/73 |
| CN | 206451944 U | | 8/2017 | |
| CN | 107438911 A | | 12/2017 | |
| CN | 207381657 U | | 5/2018 | |
| CN | 108321318 A | | 7/2018 | |
| JP | H0799072 A | | 4/1995 | |
| JP | 2001160450 A | | 6/2001 | |
| JP | 2006019296 A | | 1/2006 | |
| JP | 2011-171114 | * | 9/2011 | ............ H01M 2/20 |
| JP | 2011171114 A | | 9/2011 | |
| JP | 2013214498 A | | 10/2013 | |
| JP | 2014209407 A | | 11/2014 | |
| JP | 2018067387 A | | 4/2018 | |
| KR | 20140027751 A | | 3/2014 | |
| KR | 20140085273 A | | 7/2014 | |
| KR | 20150138426 A | | 12/2015 | |
| KR | 20160094909 A | | 8/2016 | |
| KR | 20160125629 A | | 11/2016 | |
| KR | 20170027543 A | | 3/2017 | |
| KR | 101829350 B1 | | 2/2018 | |

OTHER PUBLICATIONS

Machine English translation of JP 2011-171114 to Kuwabara (Year: 2011).*

Search Report dated May 12, 2022 from the Office Action for Chinese Application No. 201980025814.1 dated Jul. 5, 2022, 4 pages.

International Search Report for Application No. PCT/KR2019/017024 dated Mar. 23, 2020, 2 pages.

Extended European Search Report including Written Opinion for Application No. 19891755.1 dated Apr. 13, 2021, 6 pages.

* cited by examiner

BATTERY MODULE INCLUDING CONNECTOR HAVING BIDIRECTIONAL COUPLING STRUCTURE

CROSS-REFERENCE TO RELATED APPLICATIONS

This application is a national phase entry under 35 U.S.C. § 371 of International Application No. PCT/KR2019/017024, filed Dec. 4, 2019, published in Korean, which claims the benefit of priority based on Korean Patent Application No. 10-2018-0155513 filed on Dec. 5, 2018 and Korean Patent Application No. 10-2019-0159240 filed on Dec. 3, 2019 in the Korean Intellectual Property Office, the disclosures of which are incorporated herein by reference in their entirety.

TECHNICAL FIELD

The present disclosure relates to a battery module, and more particularly, to a battery module in which a module connector connected to an external connector is mounted.

BACKGROUND ART

Secondary batteries, which are easily applied to various product groups and have electrical characteristics such as high energy density, are universally applied not only for a portable device but also for an electric vehicle (EV) or a hybrid electric vehicle (HEV), an energy storage system or the like, which is driven by an electric driving source. The secondary battery is attracting attention as a new environment-friendly energy source for improving energy efficiency since it gives a primary advantage of remarkably reducing the use of fossil fuels and also does not generate by-products from the use of energy at all.

A battery pack for use in electric vehicles has a structure in which a plurality of cell assemblies, each including a plurality of unit cells, are connected in series to obtain a high output. In addition, the unit cell can be repeatedly charged and discharged by electrochemical reactions among components, which include a positive electrode current collector, a negative electrode current collector, a separator, an active material, an electrolyte and the like.

Meanwhile, as the need for a large capacity structure is increasing along with the utilization as an energy storage source in recent years, there is a growing demand for a battery pack with a multi-module structure in which a plurality of battery modules, each including a plurality of secondary batteries connected in series and/or in parallel, are integrated.

When a plurality of battery cells are connected in series or in parallel to configure a battery pack, it is common to configure a battery module composed of at least one battery cell first, and then configure a battery pack by using at least one battery module and adding other components. The number of battery modules included in the battery pack, or the number of battery cells included in the battery module may be variously set according to the required output voltage or the demanded charge/discharge capacity.

The battery module is configured to package battery cells, various electric components and the like in a module case, and further includes a module connector which is connected to an external connector for electrical connection with external devices, etc. outside the module case. The external connector may be, for example, a connector for electrically connecting a plurality of battery modules.

In the conventional battery module, the direction of the connector is predetermined for each module. Therefore, there was a need to develop a module with a symmetrical structure according to the predetermined direction of the connector. In this case, all of the same parts were re-developed in a symmetrical form, which resulted in time and cost loss, and increased process complexity.

DETAILED DESCRIPTION OF THE INVENTION

Technical Problem

Therefore, it is an object of the present disclosure to provide a battery module capable of changing the direction of a module connector as necessary after production of the battery module, by configuring the fastening structure of the module connector mounted on the battery module so that the module connector can be inserted bidirectionally.

However, the problem to be solved by the embodiments of the present disclosure is not limited to the above-described problems, and can be variously expanded within the scope of the technical idea included in the present disclosure.

Technical Solution

A battery module according to an embodiment of the present disclosure includes: a cell assembly including at least one battery cell; a module case accommodating the cell assembly; and a module connector mounted outside the module case, electrically connected to the cell assembly, and configured to connect to an external connector outside the module case. A coupling surface of the module connector may have a first fastening part opened in at least one direction, and a corresponding coupling surface outside the module case may have a second fastening part that is bidirectionally opened so as to be inserted into the first fastening part in a first direction or in a second direction opposite thereto.

The first fastening part may be a first slide rail fastening part, and the second fastening part may be a second slide rail fastening part, wherein the first slide rail fastening part and the second slide rail fastening part may be slidably coupled to each other.

The second slide rail fastening part may include at least two parallel rail members, and the first slide rail fastening part may include an inner rail member configured to pass between the two rail members of the at least two parallel rail members of the second slide rail fastening part and couple thereto.

The two rail members of the at least two parallel rail members of the second slide rail fastening part may have the respective locking protrusions which protrude in directions opposite to each other.

The respective locking protrusions of the two rail members may be spaced apart at a distance along an extending direction of the two rail members so that respective centers of the respective locking protrusions are misaligned with each other.

The respective locking protrusions may each have an inclined surface inclined to form an obtuse angle with respect to an insertion direction of the module connector.

The inner rail member of the first slide rail fastening part may include a hook configured to pass between the two rail members of the at least two parallel rail members of the second slide rail fastening part and couple thereto.

The two rail members of the at least two parallel rail members of the second slide rail fastening part may have a first locking protrusion and a second locking protrusion, respectively, which protrude in directions opposite to each other, wherein the first locking protrusion and the second locking protrusion may be spaced apart at a distance along an extending direction of the two rail members so that respective centers of the respective first and second locking protrusions are misaligned with each other, the first locking protrusion may be positioned on a relative right side, and the second locking protrusion may be positioned on a relative left side.

Respective outer inclined surfaces of the first locking protrusion and the second locking protrusion facing away from each other may form a steeper inclination angle with respect to the extending direction of the two rail members than respective inner inclined surfaces of the first locking protrusion and the second locking protrusion facing each other.

The hook may be bent to one side at an end of the inner rail member, and when the first fastening part is inserted into the second fastening part in the first direction, the hook may be locked to the outer inclined surface of the second locking protrusion. When the first fastening part is inserted into the second fastening part in the second direction, the hook may be locked to the outer inclined surface of the first locking protrusion.

The first slide rail fastening part includes at least two outer rail members extending in parallel with the inner rail member, and when the module connector is coupled to the module case, a rail member of the at least two parallel rail members of the second slide rail fastening part may be sandwiched between the outer rail members of the first slide rail fastening part.

The module connector may be locked to the corresponding coupling surface outside the module case by inserting the first fastening part into the second fastening part in the first direction.

The module connector may be locked to the corresponding coupling surface outside the module case by inserting the first fastening part into the second fastening part in the second direction.

The battery module may include a busbar assembly which covers the cell assembly on at least one side of the module case and electrically connects electrode leads of the cell assembly, wherein the busbar assembly includes the second fastening part, and the module connector may be coupled to the busbar assembly.

The module connector may be electrically connected to the cell assembly through a flexible printed circuit (FPC) board.

The flexible printed circuit board connected to the module connector may extend while being bent in different directions over a plurality of times.

According to another embodiment of the present disclosure, there can be provided a battery pack including at least one of the above battery modules and a pack case packaging the at least one battery module.

According to still another embodiment of the present disclosure, there can be provided a device including at least one of the battery packs.

Advantageous Effects

According to the embodiments, a module connector having a fastening structure capable of being inserted and coupled bidirectionally can be applied to a battery module, thereby making it possible to change the direction of the module connector as necessary after production of the battery module.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Further, throughout the specification, when apart is referred to as "including" a certain component, it means that it can further include other components, without excluding the other components, unless otherwise stated.

Further, throughout the specification, when referred to as "planar", it means when a target portion is viewed from the top, and when referred to as "cross-sectional", it means when a target portion is viewed from the side of a cross section cut vertically.

Figure 1:
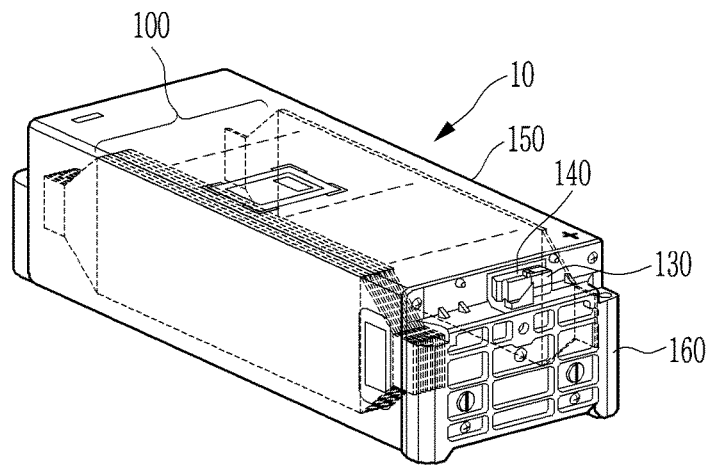
FIG. 1 is a perspective view showing a battery module according to an embodiment of the present disclosure.
Figure 2:
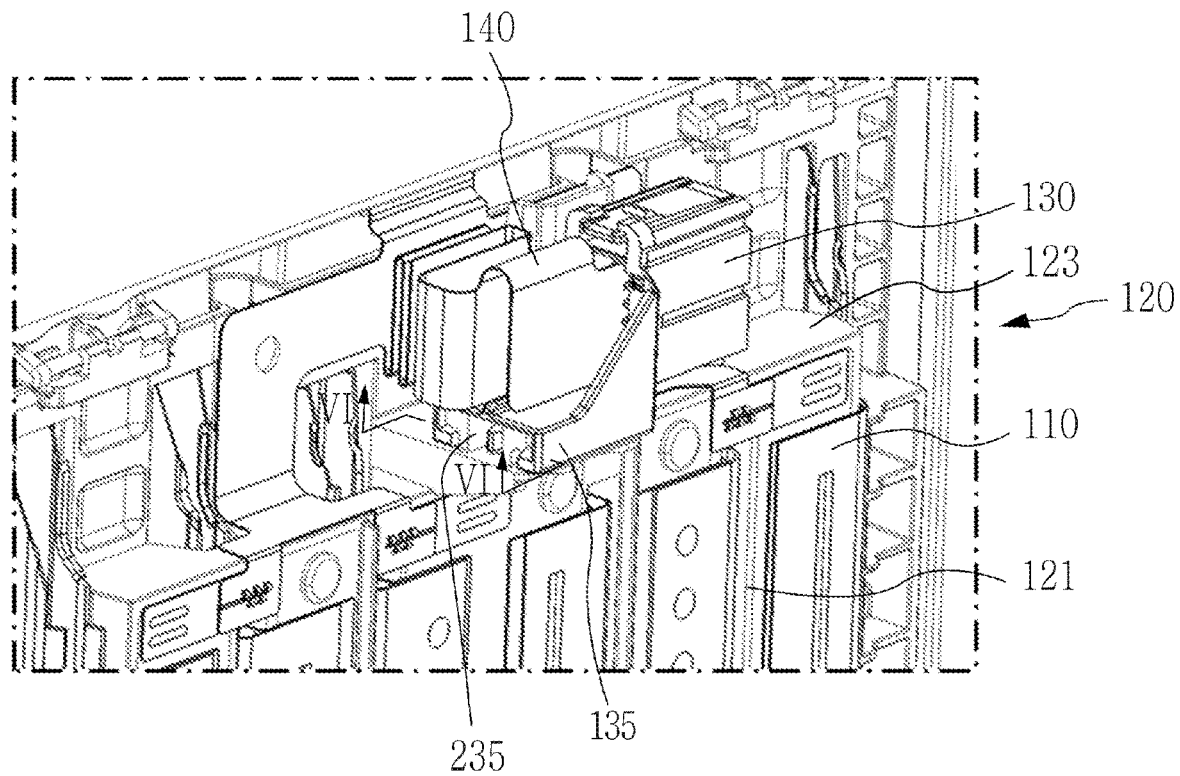
FIG. 2 is an enlarged perspective view showing a state in which a module connector in a battery module according to an embodiment of the present disclosure is mounted.

FIG. 1 is a perspective view showing a battery module according to an embodiment of the present disclosure. FIG. 2 is an enlarged perspective view showing a state in which a module connector 130 in a battery module according to an embodiment of the present invention is mounted.

Referring to FIGS. 1 and 2, a battery module 10 according to the present embodiment includes a module connector 130 mounted outside a module case 150 accommodating a cell assembly 100. Battery cells constituting the cell assembly 100 may be provided as a pouch-type secondary battery, and may be provided by stacking a plurality of battery cells in the cell assembly 100. The plurality of battery cells may be electrically connected to each other, and each of the battery cells may include an electrode assembly, a battery case accommodating the electrode assembly, and an electrode lead 110 protruding out of the battery case and electrically connected to the electrode assembly.

The battery module 10 may include various electric components, and may include, for example, an internal circuit board (ICB) and a battery management system (BMS). Electric components such as the ICB and the BMS board may be electrically connected to the plurality of battery cells.

The module case 150 forms the exterior of the battery module 10 and accommodates the cell assembly 100, wherein a busbar assembly 120 may be coupled to at least one side or both sides of the cell assembly 100 positioned in the direction where the electrode leads 110 of the cell assembly 100 extend, and an insulating frame 160 may be coupled to the outside thereof. The busbar assembly 120 may include a busbar frame 123 disposed to cover the cell assembly 100, and a busbar fixed to the busbar frame 123. The busbar frame 123 is made of an insulator and includes a lead slot through which the electrode leads 110 of the cell assembly 100 can pass. The busbar 121 may electrically connect the electrode leads 110 of the cell assembly 100.

Referring to FIG. 2, the module connector 130 may be coupled to the busbar assembly 120, particularly the busbar frame 123. The module connector 130 has a first fastening part 135 opened in at least one direction on a coupling surface of the lower portion thereof, and the busbar frame 123 has a second fastening part 235 configured on a corresponding coupling surface outside the module case 150 so as to be coupled to the first fastening part 135. In this embodiment, the first fastening part 135 and the second fastening part 235 may be formed of a slide rail fastening part. In the following, they are referred to as a first slide rail fastening part and a second slide rail fastening part, respectively. However, the present disclosure is not limited to this embodiment, and any module connector having a fastening part with a structure that can be inserted bidirectionally may be included in the scope of the present disclosure.

Meanwhile, the battery module 10 may include a flexible printed circuit (FPC) board 140 configured to sense the battery cells inside the module case 150, and the flexible printed circuit board 140 extends out of the module case 150 and is connected to the module connector 130. Accordingly, the module connector 130 may be electrically connected to the cell assembly 100 via the flexible printed circuit board 140. In addition, since the flexible printed circuit board 140 is formed to extend while being bent in different directions over a plurality of times, the degree of freedom in the fastening process may be increased.

Figure 3:
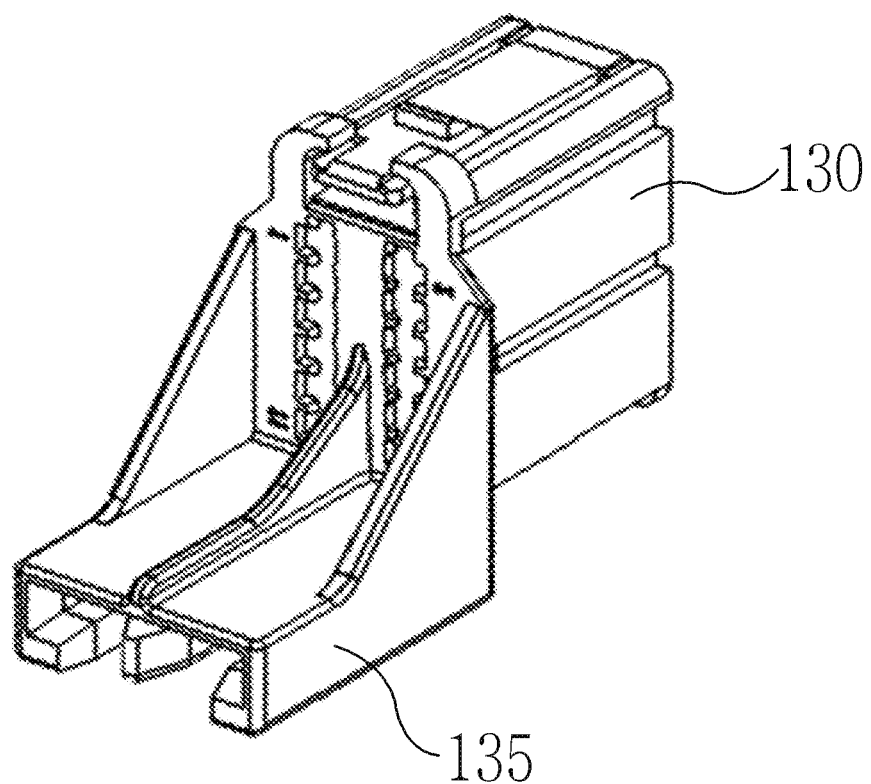
FIG. 3 is a perspective view showing a module connector of a battery module according to an embodiment of the present disclosure.
Figure 4:
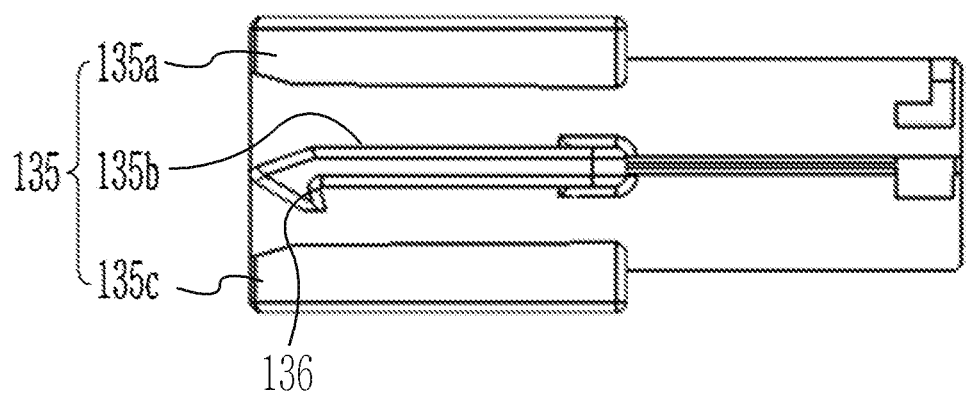
FIG. 4 is a bottom view showing a module connector of a battery module according to an embodiment of the present disclosure.
Figure 5:
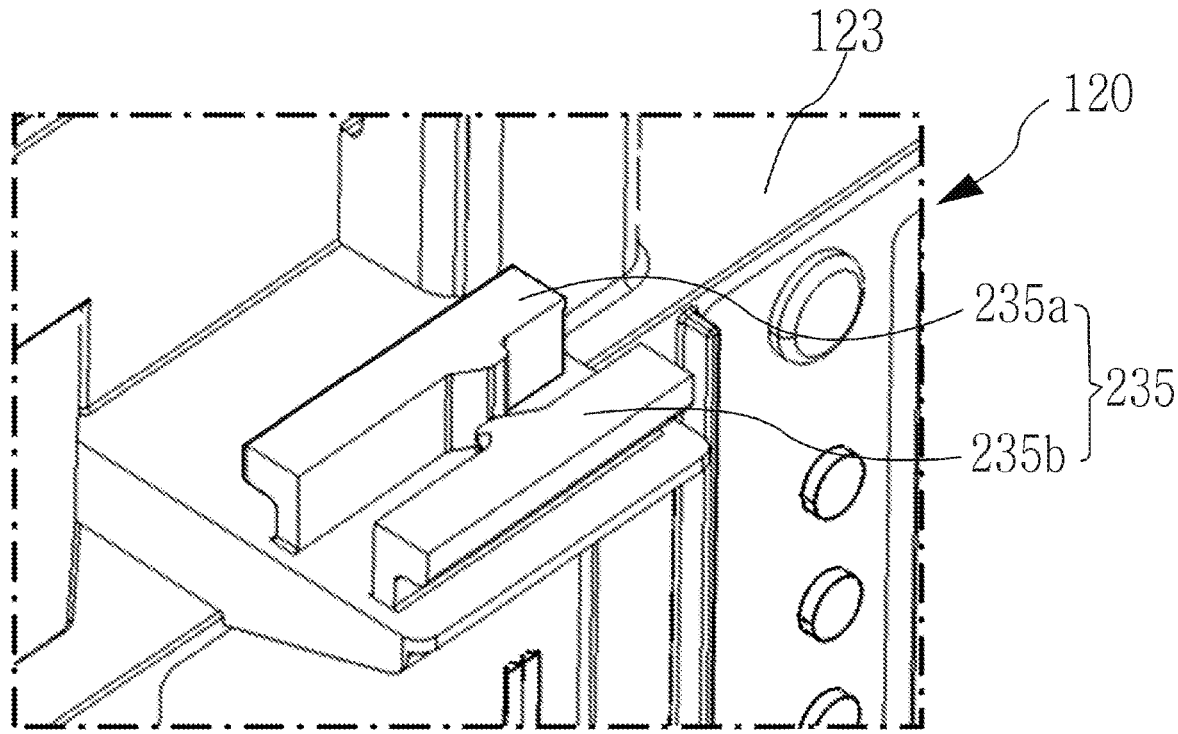
FIG. 5 is an enlarged perspective view showing a fastening part of a busbar assembly in which a module connector of a battery module according to an embodiment of the present disclosure is mounted.
Figure 6:
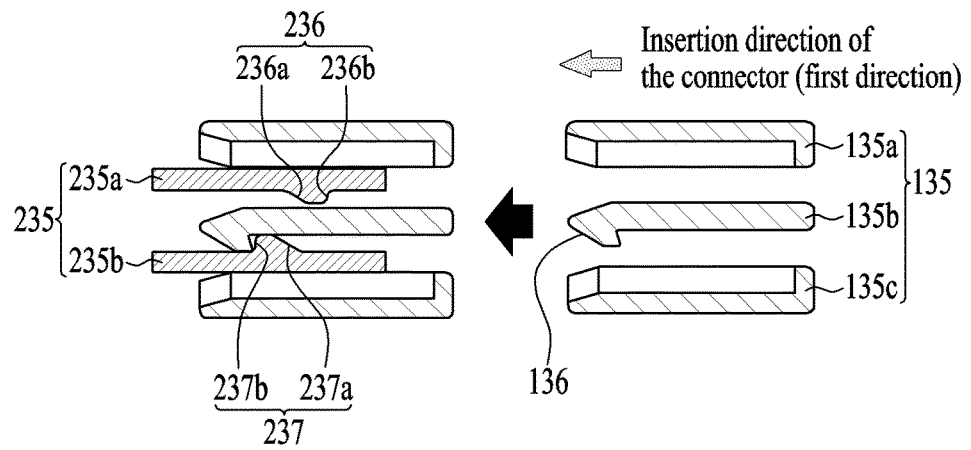
FIG. 6 is a cross-sectional view taken along line VI-VI of FIG. 2 and illustrating a first fastening example of a module connector according to an embodiment of the present disclosure.

FIG. 3 is a perspective view showing a module connector of a battery module according to an embodiment of the present disclosure, FIG. 4 is a bottom view showing a module connector of a battery module according to an embodiment of the present disclosure, FIG. 5 is an enlarged perspective view showing a fastening part of a busbar assembly in which a module connector of a battery module according to an embodiment of the present disclosure is mounted, and FIG. 6 is a cross-sectional view taken along line VI-VI of FIG. 2 and illustrating a first fastening example of a module connector according to an embodiment of the present disclosure.

Referring to FIGS. 3 and 4, the module connector 130 of the present embodiment has a first slide rail fastening part 135 opened in at least one direction on the coupling surface of the lower portion. Referring to FIG. 5, the corresponding coupling surface outside the module case 150, i.e., the busbar frame 123 of the busbar assembly 120 has a second slide rail fastening part 235 opened bidirectionally. Therefore, the first slide rail fastening part 135 may be coupled to the second slide rail fastening part 235 in a first direction or in a second direction opposite thereto through the opened portion. Thus, the module connector 130 can be coupled to the busbar assembly 120. In a first fastening example, as shown in FIG. 6, the first slide rail fastening part 135 is inserted into the second slide rail fastening part 235 in the first direction (from right to left in FIG. 6), so that it can be locked to the corresponding coupling surface outside the module case 150 of FIG. 1.

The first slide rail fastening part 135 of the module connector 130 includes three parallel rail members 135a, 135b and 135c, and the second slide rail fastening part 235 of the busbar frame 123 includes two parallel rail members 235a and 235b. Among the rail members 135a, 135b and 135c of the first slide rail fastening part 135, the inner rail member 135b may be configured to pass between the two rail members 235a and 235b of the second slide rail fastening part 235 and couple thereto.

The two rail members 235a and 235b of the second slide rail fastening part 235 may have locking protrusions 236 and 237 which protrude in directions opposite to each other, respectively. These locking protrusions 236 and 237 may have an inclined surface inclined with respect to the insertion direction of the module connector 130. That is, since the module connector 130 can be inserted into the second slide rail fastening part 235 in the first direction or in the second direction as described above, both the inclined surfaces of the locking protrusions 236 and 237 may be bidirectionally inclined to form an obtuse angle with respect to the extending direction of the rail member. In addition, the locking protrusions 236 and 237 opposite to each other may be spaced apart at a distance along the extending direction of the rail member so that the respective centers are misaligned with each other. Further, inclination angle of the inclined surfaces back to each other (in opposite directions) may be formed more steeply than that of the inclined surfaces facing each other in the pair of locking protrusions 236 and 237. Here, the inclined surfaces facing each other in the pair of locking protrusions 236 and 237 are referred to as inner inclined surfaces 236a and 237a, and the inclined surfaces back to each other (in opposite direction) are referred to as outer inclined surfaces 236b and 237b. That is, the outer inclined surfaces 236b and 237b in the pair of locking protrusions 236 and 237 can respectively forma steeper inclined angle with respect to the extending direction of the rail members 235a and 235b than each of the inner inclined surfaces 236a and 237a.

Specifically, in the first locking protrusions 236 positioned relatively on the right side among the locking protrusions 236 and 237 where the centers are misaligned with each other, the inclination angle of the outer inclined surface 236b may be formed more steeply than that of the inner inclined surface 236a, and in the second locking protrusions 237 positioned relatively on the left side among the locking protrusions 236 and 237 where the centers are misaligned with each other, the inclination angle of the outer inclined surface 237b may be formed more steeply than that of the inner inclined surface 237a.

Meanwhile, the inner rail member 135b of the first slide rail fastening part 135 is a hook-type rail member configured to pass between the two rail members 235a and 235b of the second slide rail fastening part 235 and lock thereto. The end of the hook-type rail member includes a hook 136 which is bent to one side, and the other side opposite to the hook 136 may be chamfered. Therefore, when the module connector 130 is coupled, the inner rail member 135b of the first slide rail fastening part 135 passes between the two rail members 235a, 235b of the second slide rail fastening part 235 and, thus, the hook 136 may sequentially pass through two locking protrusions 236 and 237 and be locked.

Specifically, when the first slide rail fastening part 135 is inserted in the first direction (from right to left as viewed in FIG. 6), the hook 136 may pass though the inner inclined surface 237a of the second locking protrusion 237 located on the left side and then locked to the outer inclined surface 237b of the second locking protrusion 237. The inner inclined surface 237a forms a relatively gradual inclination angle and, therefore, is easy for the hook 136 to pass through, and the outer inclined surface 237b forms a relatively steep inclination angle, so the hook 136 can be firmly locked thereto.

In addition, since the side opposite to the hook 136 is chamfered, it can easily pass through the outer inclined surface 236b of the first locking protrusion 236 located on the right side.

The first slide rail fastening part 135 of the module connector 130 may include two outer rail members 135a and 135c extending in parallel with the inner rail member 135b. When the module connector 130 is coupled, the rail members 235a and 235b of the second slide rail fastening part 235 may be sandwiched between the outer rail members 135a and 135c of the first slide rail fastening part 135.

Figure 7:
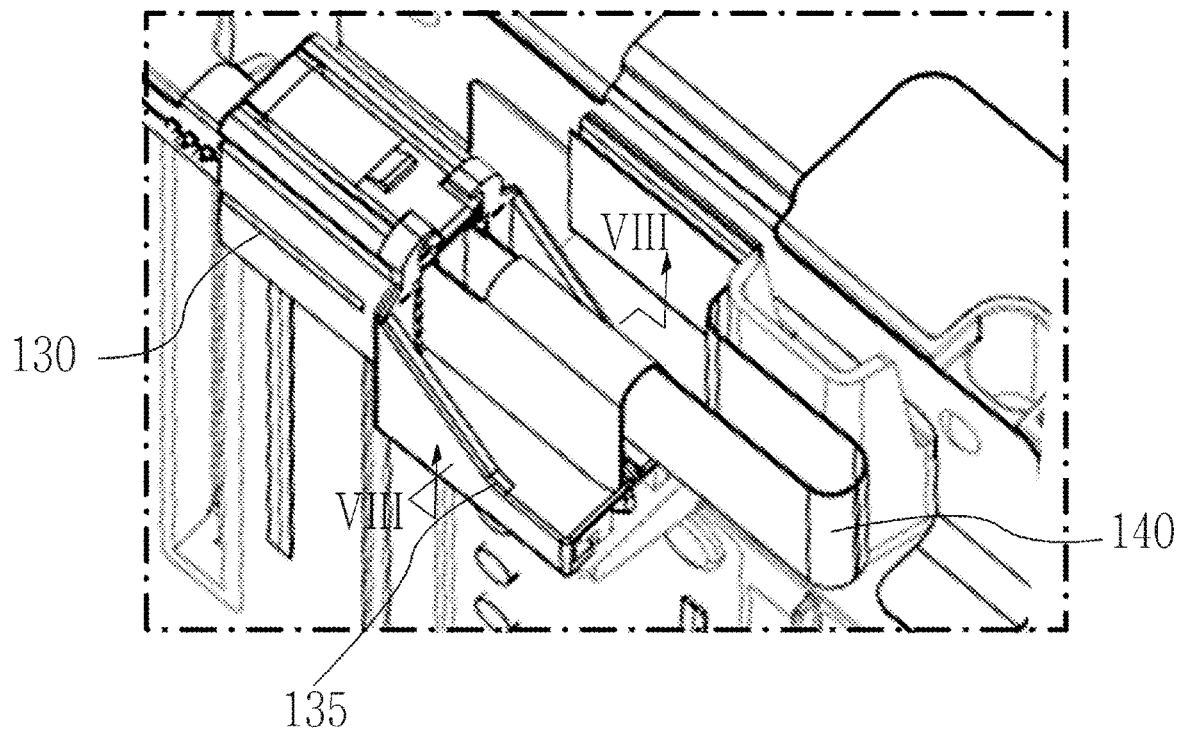
FIG. 7 is a perspective view showing a second fastening example of a module connector according to an embodiment of the present disclosure.
Figure 8:
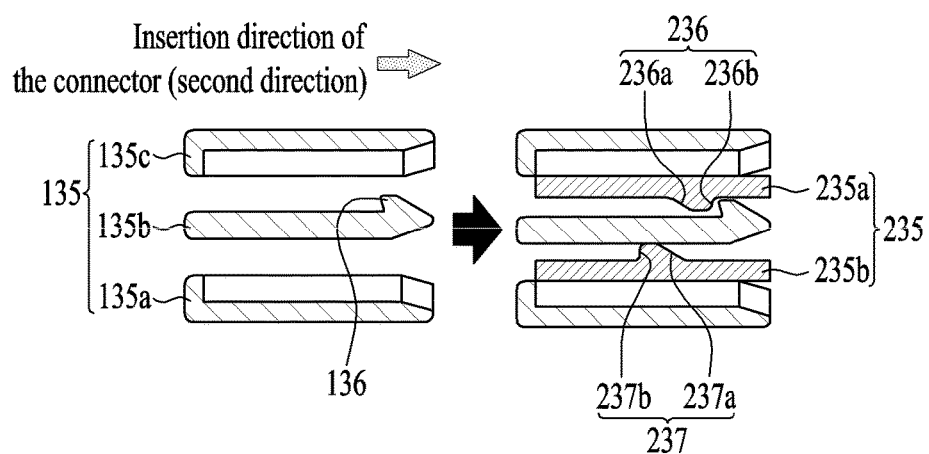
FIG. 8 is a cross-sectional view taken along line VIII-VIII of FIG. 7 and illustrating a second fastening example of a module connector according to an embodiment of the present disclosure.

FIG. 7 is a perspective view showing a second fastening example of a module connector according to an embodiment of the present disclosure, and FIG. 8 is a cross-sectional view taken along line VIII-VIII of FIG. 7 and illustrating the second fastening example of a module connector according to an embodiment of the present disclosure.

Referring to FIGS. 7 and 8, the first slide rail fastening part 135 is inserted into the second slide rail fastening part 235 in a second direction (from left to right as viewed in FIG. 8), so that the module connector 130 can be locked to the corresponding coupling surface outside the module case 150 of FIG. 1. That is, as described above, the module connector 130 may be fastened to the second slide rail fastening part 235 formed on the busbar frame 123 via the first slide rail fastening part 135. However, in the second fastening example, it is inserted and fastened from the opposite direction to the first fastening example. In this case, since the flexible printed circuit board 140 extending from the cell assembly 100 is formed to extend while being bent in different directions over a plurality of times, it can be stretched and connected according to the changed direction of the module connector 130.

In addition, even when the hook 136 of the inner rail member 135b of the first slide rail fastening part 135 formed in the module case 150 is inserted in the second direction, it may be locked by sequentially passing through two locking protrusions 236 and 237 formed on the rail members 235a and 235b of the second slide rail fastening part 235.

Specifically, when the first slide rail fastening part 135 is inserted in the second direction (from left to right as viewed in FIG. 8), the hook 136 passes through the inner inclined surface 236a of the first locking protrusion 236 located on the right side, and then may be locked to the outer inclined surface 236b of the first locking protrusion 236. The inner inclined surface 236a forms a relatively gradual inclination angle and, thus, is easy for the hook 136 to pass through, and the outer inclined surface 236b forms a relatively steep inclination angle, so that the hook 136 can be firmly locked thereto.

Moreover, since the side opposite to the hook 136 is chamfered, it can easily pass through the outer inclined surface 237b of the second locking protrusion 237 located on the left side.

In addition, the outer rail members 135a and 135c of the first slide rail fastening part 135 are defined outside the rail members 235a and 235b of the second slide rail fastening part 235 so that the latter members can be sandwiched between the former members.

Thus, according to the embodiment of the present disclosure, the connector, which has a fastening structure in which it can be inserted and coupled bidirectionally, can be applied to a battery module, thereby making it possible to change the direction of the module connector as necessary after production of the battery module.

In particular, as described above, through the hook 136 of the inner rail member 135b and the pair of locking protrusions 236 and 237 having their respective outer inclined surfaces 236b and 237b forming a steeper inclination angle compared to the inner inclined surfaces 236a and 237a, it is possible to implement both the bidirectional insertion of the module connector 130 and the firm coupling upon insertion.

Meanwhile, one or more of the battery modules according to an embodiment of the present disclosure may be packaged in a pack case to form a battery pack.

The battery module as described above and the battery pack including the same can be applied to various devices. Such devices include, but are not limited to, transportation means such as an electric bicycle, an electric vehicle, and a hybrid vehicle, and the present disclosure is applicable to various devices capable of using any battery module and any battery pack including the same, which belongs to the scope of the invention.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS AND SYMBOLS

10: battery module
100: cell assembly
110: electrode lead
120: busbar assembly
121: busbar
123: busbar frame
130: module connector
135: first slide fastening part
135a, 135c: outer rail member of first slide fastening part
135b: inner rail member of first slide fastening part
136: hook
140: flexible printed circuit board
150: module case
235: second slide rail fastening part
235a, 235b: rail member of the second slide rail fastening part
236, 237: locking protrusion

The invention claimed is:
1. A battery module comprising:
a cell assembly including at least one battery cell;
a module case accommodating the cell assembly; and a module connector mounted outside the module case, electrically connected to the cell assembly, and configured to connect to an external connector outside the module case, wherein a coupling surface of the module connector has a first fastening part opened in at least one direction, and a corresponding coupling surface outside the module case has a second fastening part opened bidirectionally so as to be received in the first fastening part by advancing the module connector relative to the coupling surface in a first direction or in a second direction opposite thereto, the first direction and the second direction extending along a central axis of the second fastening part, wherein the first fastening part has a locking element, wherein the second fastening part has a first locking protrusion and a second locking protrusion, the first locking protrusion being arranged to engage the locking element when advancing the module connector in the first direction and the second locking protrusion being arranged to engage the locking element when advancing the module connector in the second direction, and wherein the first locking protrusion and the second locking protrusion face each other on opposing sides of the central axis.

2. The battery module of claim 1, wherein the first fastening part and the second fastening part are slidably coupled to each other.

3. The battery module of claim 2, wherein the second fastening part includes at least two parallel rail members, and the first fastening part includes an inner rail member configured to pass between two rail members of the at least two parallel rail members of the second fastening part and couple thereto.

4. The battery module of claim 3, wherein the two rail members of the at least two parallel rail members of the rail fastening part have the respective first and second locking protrusions protruding in directions opposite to each other.

5. The battery module of claim 4, wherein the respective first and second locking protrusions of the two rail members are spaced apart at a distance along an extending direction of the two rail members so that respective centers of therespective first and second locking protrusions are misaligned with each other.

6. The battery module of claim 4, wherein the respective first and second locking protrusions each have an inclined surface inclined to form an obtuse angle with respect to an insertion direction of the module connector.

7. The battery module of claim 3, wherein the locking element is a hook, wherein the inner rail member of the first fastening part includes the hook configured to pass between the two rail members of the at least two parallel rail members of the second fastening part and couple thereto.

8. The battery module of claim 7, wherein the two rail members of the at least two parallel rail members of the second fastening part have the first locking protrusion and the second locking protrusion, respectively, which protrude in directions opposite to each other, the first locking protrusion and the second locking protrusion are spaced apart at a distance along an extending direction of the two rail members so that respective centers of the respective first and second locking protrusions are misaligned with each other, the first locking protrusion is positioned on a relative right side, and the second locking protrusion is positioned on a relative left side.

9. The battery module of claim 8, wherein respective outer inclined surfaces of the first locking protrusion and the second locking protrusion facing away from each other form a steeper inclination angle with respect to the extending direction of the two rail members than respective inner inclined surfaces of the first locking protrusion and the second locking protrusion facing each other.

10. The battery module of claim 9, wherein
the hook is bent to one side at an end of the inner rail member,
when the first fastening part is inserted into the second fastening part in the first direction, the hook is locked to the outer inclined surface of the second locking protrusion, and
when the first fastening part is inserted into the second fastening part in the second direction, the hook is locked to the outer inclined surface of the first locking protrusion.

11. The battery module of claim 3, wherein the first fastening part includes at least two outer rail members extending in parallel with the inner rail member, and
when the module connector is coupled to the module case, a rail member of the at least two parallel rail members of the second fastening part is sandwiched between the outer rail members of the first fastening part.

12. The battery module of claim 1, wherein the module connector is locked to the corresponding coupling surface outside the module case by inserting the first fastening part into the second fastening part in the first direction.

13. The battery module of claim 1, wherein the module connector is locked to the corresponding coupling surface outside the module case by inserting the first fastening part into the second fastening part in the second direction.

14. The battery module of claim 1, comprising a busbar assembly which covers the cell assembly on at least one side of the module case and electrically connects electrode leads of the cell assembly, wherein the busbar assembly includes the second fastening part, and the module connector is coupled to the busbar assembly.

15. The battery module of claim 1, wherein the module connector is electrically connected to the cell assembly via a flexible printed circuit (FPC) board.

16. The battery module of claim 15, wherein the flexible printed circuit board connected to the module connector is sufficiently flexible so as to be configured to extends while being bent in a plurality of different directions.

17. A battery pack comprising:
at least one battery module according to claim 1; and
a pack case packaging the at least one battery module.

18. A device comprising at least one battery pack according to claim 17.

* * * * *